United States Patent Office 2,746,424
Patented May 22, 1956

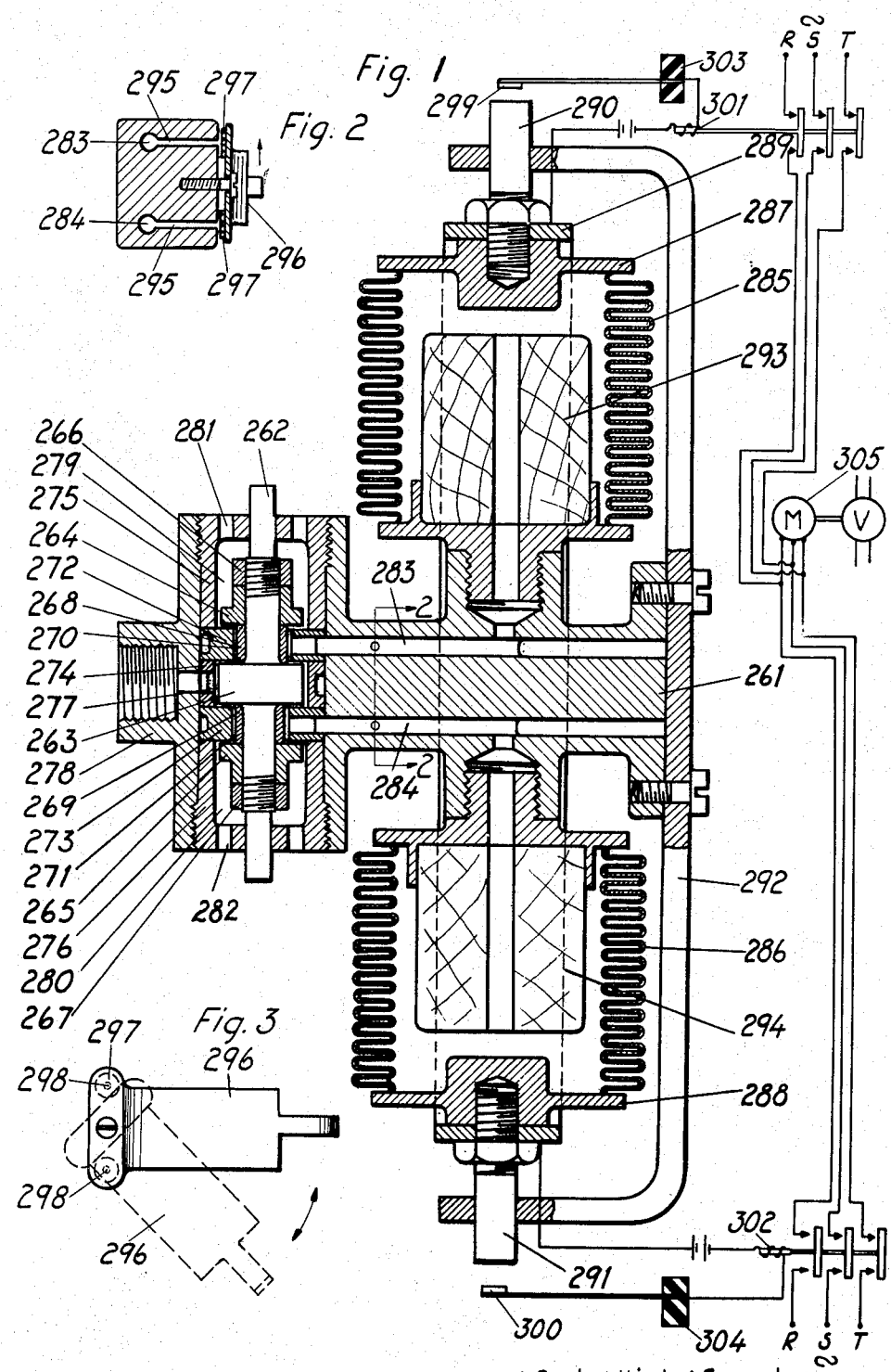

2,746,424

BALANCED VALVE FLUID-ACTUATED CONTROL DEVICE

Carl Gustaf Hård af Segerstad and Alvar Torsten Westberg, Sandviken, Sweden, assignors to Sandvikens Jernverks Aktiebolag, Sandviken, Sweden Application May 7, 1952, Serial No. 286,637

2 Claims. (Cl. 121—38)

The present invention relates to devices for the amplification or detection of small displacements, small deviations from a predetermined dimension or quantity, etc.

More particularly, the invention relates to devices for the purpose indicated, in which the displacement etc. controls the flow of fluid in a fluid system in such manner as to produce variations of pressure in said system, which are made to actuate suitable pressure responsive means.

The device according to the invention may be adapted to a variety of purposes, for instance in measuring or recording apparatus, or in control or regulating apparatus for the control of one quantity in dependence upon another quantity, or for maintaining a quantity within predetermined limits.

An object of the invention is to provide a universally applicable device of the kind indicated.

Another object of the invention is to provide a device of the kind indicated, which has a high degree of magnification or sensitivity.

A further object of the invention is to provide an adjustment device in order to adjust different amplications or measuring ranges of the instrument.

Still further objects of the invention will appear from the following specification in connection with the accompanying drawings, in which:

Fig. 1 is a longitudinal sectional view of a preferred embodiment of the invention.

Fig. 2 is a vertical sectional view taken along the line 2—2 in Fig. 1 and shows the outlet orifices in the conduits to the bellows of this type of instrument, which orifices may be closed by a knob.

Fig. 3 is a type of close knobs, used in connection with the orifices, shown in Fig. 2.

The embodiment shown has a frame or body 261 in which an operating spindle 262 is longitudinally displaceable. Said spindle is provided with a central flange 263 integral with the spindle, and two side flanges 264, 265 held against spacing rings 268, 269 by nuts 266, 267. Each spacing ring is surrounded by a stationary ring 272, 273, respectively, said stationary rings being clamped between screw caps 275, 276 together with an intermediate spacing ring 274. Said screw caps also serve to guide the spindle 262. The space 277 between the central flange 263 and the spacing ring 274 forms an inlet chamber for pressure fluid, e. g. air, supplied at constant pressure to the inlet connection 278. The space 270 between the spacing ring 268 and the stationary ring 272 forms a pressure chamber connected on one side with the inlet chamber aforementioned through the narrow annular slit between the central flange 263 and the ring 272 and on the other side with a chamber 279 through the narrow annular slit between the ring 272 and the upper flange 264. Said chamber communicates with the atmosphere through holes 281 in the cap 275. The space 271 between the spacing ring 269 and the stationary ring 273 forms another pressure chamber connected on one side with the inlet chamber aforementioned through the narrow annular slit between the central flange 263 and the ring 273 and on the other side with a chamber 280 through the narrow annular slit between the ring 273 and the lower flange 265. The chamber 280 communicates with the atmosphere through holes 282 in the cap 276.

It is obvious that any displacement of the spindle 262 from its neutral position will cause a difference between the pressure in the pressure chambers 270, 271. If the spindle is, for instance, displaced downwards from the neutral position, the pressure in the upper chamber 270 will increase, while the pressure in the lower chamber 271 will decrease. The conduits for pressure fluid may be provided with small bleeder outlets 295, terminating in regulating orifices, which may be closed to any desired extent by a suitable closure member 296, for instance a pivoted member (Fig. 3) with laterally disposed closure plates 297 for each of the outlet orifices 298. Such open outlets cause a reduction of variations in fluid pressure in the chamber by conducting pressure fluid from the chambers into means responsive to variations of pressure. Such orifices may communicate with the conduits for pressure fluid 283, 284, and each orifice for one conduit be paired with one orifice for the other conduit in order to be simultaneously closed or opened by turning a common control member 296 (Fig. 3). The conduit has been described as being provided with several outlets with the same or different areas, every one having an orifice 298 simultaneously closed or opened together with and to the same extent as an adjacent orifice 298 for the other conduit. Such regulation operations may be performed by means of a common control member or the like and this control member may be provided with a calibrated scale (not shown). The outlets may also be placed for example at the spaces 271 of the operating spindle 263 or at the ends of the conduits 283, 284 or at any other suitable place in the instrument.

The pressure chambers are connected to bellows 285, 286, respectively, through conduits 283, 284, respectively. The free ends 287, 288 of said bellows are connected with one another through a frame 289 and are each provided with a guide pin 290, 291 engaging a bore in a yoke piece 292 attached to the frame or body 261.

There is now here described the operation of and interaction between elements 295, 296, 297 and 298 in detail. In Fig. 3 two positions for the closure member are shown, open orifices 298 (with dotted lines) and closed orifices with the mentioned difference in pressure as stated. It is also possible to use several pairs of orifices with different areas, closable by means of the same control lever. It is also possible to use continuous closing, i. e., a variable degree of closing for the same orifice.

The spindle 262 may be operated by an operating rod or feeler adapted to engage a workpiece to be gauged, or by any other movable member the deflections or deviations of which are to be measured or amplified. The movable system formed by the free ends 287, 288 of the bellows, the frame 289 and the pins 290, 291 may be adapted to operate any desired indicating or controlling device in response to small vertical displacements of the spindle 262. The guide pins may for example be arranged to control one or more electric circuits. In the example, shown in Fig. 1 each pin 290, 291 is arranged to close or open an electrical circuit, the two circuits controlling, respectively, the operation of relays 301 or 302 by engagement with a stationary contact 299 or 300, respectively, the stationary contacts 299 and 300 being shown mounted on insulating blocks 303 and 304.

Relay 301 applies three phase power to a three phase motor 305 for one direction of rotation and relay 302 applies three phase power with the opposite direction of phase rotation for causing motor 305 to operate in the opposite direction.

Motor 305 is arranged to open or close a control valve V for a hydraulically or pneumatically actuated device (not shown) whose operation effects the vertical displacement of control spindle 262. Obviously, other types of electrical, fluid actuated, or mechanical control systems may be used without departing from the spirit and scope of the invention as defined in the appended claims.

What we claim is:

1. A device of the class described responsive to small mechanical displacements comprising, in combination with two pressure chambers, each provided with throttled inlet passages connected to a common source of fluid under pressure and provided with throttled outlet passages, means movable in response to said mechanical displacements for simultaneously controlling the degree of throttling of all of said inlet and outlet passages, whereby any displacement of said movable means will produce an increase in the effective cross-sectional area of the inlet passage of one chamber and the outlet passage of said other chamber, while simultaneously reducing the effective cross-sectional area of the outlet passage of said first-named chamber and the inlet passage of said second-named chamber, a pair of closed fluid actuable housings of variable volume, said volumes being variable in accordance with any difference between the fluid pressures in the two housings of said pair, and individual duct means connecting each of said housings with one of said throttled outlet passages; the provision of a pair of bleeder outlets communicating individually with each of said duct means; and movable closure means for simultaneously closing both of said bleeder outlets, said fluid being air and means being provided whereby said bleeder outlets communicate with the circumambient atmosphere, said bleeder outlets comprising a flat surfaced member having orifices formed in said surface, and said closure means comprising a pivotally mounted lever and closure plates carried by said lever and engaging said flat surface, said plates being arranged to close said orifices simultaneously and to substantially equal extents in response to movement of said lever.

2. A device according to claim 1, in which said orifices are located substantially in a single plane and in which said closure plates carried by said lever engage said orifices.

References Cited in the file of this patent

UNITED STATES PATENTS

| | | |
|---|---|---|
| 901,613 | Herrgott | Oct. 20, 1908 |
| 1,169,304 | Turner | Jan. 25, 1916 |
| 1,889,269 | Woodbury et al. | Nov. 29, 1932 |
| 2,187,114 | Ellwood | Jan. 16, 1940 |
| 2,303,752 | Meredith | Dec. 1, 1942 |
| 2,317,383 | Hull | Apr. 27, 1943 |
| 2,582,088 | Walthers | Jan. 8, 1952 |

FOREIGN PATENTS

| | | |
|---|---|---|
| 801,509 | France | May 23, 1936 |